United States Patent
Nishikawa et al.

(10) Patent No.: US 9,711,892 B2
(45) Date of Patent: Jul. 18, 2017

(54) METHOD FOR PRODUCING STRUCTURE FOR END OF MI CABLE

(71) Applicant: Okazaki Manufacturing Company, Hyogo (JP)

(72) Inventors: Taketo Nishikawa, Hyogo (JP); Kazuhide Okazaki, Hyogo (JP)

(73) Assignee: OKAZAKI MANUFACTURING COMPANY, Hyogo (JP)

( * ) Notice: Subject to any disclaimer, the term of this patent is extended or adjusted under 35 U.S.C. 154(b) by 0 days.

(21) Appl. No.: 14/356,949

(22) PCT Filed: Jun. 4, 2013

(86) PCT No.: PCT/JP2013/003517
§ 371 (c)(1),
(2) Date: May 8, 2014

(87) PCT Pub. No.: WO2014/195992
PCT Pub. Date: Dec. 11, 2014

(65) Prior Publication Data
US 2016/0134047 A1    May 12, 2016

(51) Int. Cl.
*H01R 4/24* (2006.01)
*H01R 13/52* (2006.01)
(Continued)

(52) U.S. Cl.
CPC ......... *H01R 13/521* (2013.01); *H01R 43/005* (2013.01); *H01R 43/16* (2013.01);
(Continued)

(58) Field of Classification Search
CPC .......................... H01R 4/5033; H01R 13/5202
(Continued)

(56) References Cited

U.S. PATENT DOCUMENTS 4,629,269 A * 12/1986 Kailus ................ H01R 13/5221
439/587
5,017,159 A *  5/1991 Legrady ................ H01R 9/091
439/741
(Continued)

FOREIGN PATENT DOCUMENTS

JP    S56-101755 U    8/1981
JP    S57-25110 A    2/1982
(Continued)

OTHER PUBLICATIONS

International Search Report issued in Application No. PCT/JP2013/003517 dated Aug. 6, 2013.
(Continued)

*Primary Examiner* — Hae Moon Hyeon
*Assistant Examiner* — Thang Nguyen
(74) *Attorney, Agent, or Firm* — Pearne & Gordon LLP (57) ABSTRACT

The present invention provides a structure for an end of an MI cable, capable of being produced in a short time with a small number of processing steps. In the structure for the end of the MI cable, a connector including metal pins is attached to the end of the MI cable, and the metal pins respectively have sharp-pointed front ends stuck into the end faces of the wires of the MI cable, and rear ends functioning as electrodes for connection with a soft cable.

9 Claims, 4 Drawing Sheets (51) Int. Cl.
*H02G 1/14* (2006.01)
*H01R 43/00* (2006.01)
*H01R 43/16* (2006.01)
*H01R 43/28* (2006.01)
*H02G 15/00* (2006.01)
*H02G 15/04* (2006.01)
*H02G 15/18* (2006.01)
*H01R 103/00* (2006.01)

(52) U.S. Cl.
CPC ............... *H01R 43/28* (2013.01); *H02G 1/14* (2013.01); *H01R 13/5216* (2013.01); *H01R 2103/00* (2013.01); *H02G 15/003* (2013.01); *H02G 15/04* (2013.01); *H02G 15/18* (2013.01)

(58) Field of Classification Search
USPC .................................. 439/427, 428, 84, 589
See application file for complete search history.

(56) References Cited

U.S. PATENT DOCUMENTS

| | | | | |
|---|---|---|---|---|
| 5,082,460 | A * | 1/1992 | Legrady | H01R 9/091 29/874 |
| 5,548,486 | A * | 8/1996 | Kman | H01R 12/58 361/744 |
| 5,775,934 | A * | 7/1998 | McCarthy | H01R 4/5033 439/427 |
| 5,915,999 | A * | 6/1999 | Takenaka | H01R 12/585 439/751 |
| 6,123,567 | A * | 9/2000 | McCarthy | H01R 4/5033 439/427 |
| 6,155,887 | A * | 12/2000 | Cuff | H01R 12/585 439/751 |
| 6,350,146 | B1 * | 2/2002 | Su | H01R 4/5033 439/427 |
| 6,705,884 | B1 * | 3/2004 | McCarthy | H01R 4/5033 439/394 |
| 6,716,063 | B1 * | 4/2004 | Bryant | H01R 13/5208 439/589 |
| 6,857,895 | B2 * | 2/2005 | Korte | H01R 4/5033 439/427 |
| 7,520,772 | B2 * | 4/2009 | Hanks | H01R 4/5033 439/393 |
| 8,137,136 | B1 * | 3/2012 | Bench | H01R 13/5216 439/604 |
| 8,485,833 | B2 * | 7/2013 | Kataoka | H01R 12/585 439/79 |
| 2008/0233791 | A1 * | 9/2008 | Hanks | H01R 4/5033 439/427 |
| 2009/0215306 | A1 * | 8/2009 | Hanks | H01R 4/5033 439/427 |
| 2010/0216356 | A1 * | 8/2010 | Takehara | H01R 4/5033 439/863 |
| 2011/0104929 | A1 * | 5/2011 | Suzuki | H01R 4/5033 439/345 |

FOREIGN PATENT DOCUMENTS

| | | |
|---|---|---|
| JP | S57-110016 A | 8/1982 |
| JP | S57-150489 U | 9/1982 |
| JP | H11-166867 A | 6/1999 |
| JP | 2010-257582 A | 11/2010 |

OTHER PUBLICATIONS

Written Opinion in Application No. PCT/JP2013/003517 dated Aug. 6, 2013.

* cited by examiner

METHOD FOR PRODUCING STRUCTURE FOR END OF MI CABLE

TECHNICAL FIELD

The present invention relates to a structure for an end of an MI (mineral insulation) cable in which a wire is held in a metal sheath with a mineral insulating powder interposed therebetween, and which is used for a sheathed thermocouple, a sheathed resistance thermometer, a microheater, or the like, and a method for producing the same.

BACKGROUND ART

An MI cable is a cable in which one or a plurality of wires are held in a metal sheath with a mineral insulating powder such as magnesia, silica, alumina, or the like, interposed therebetween.

An MI cable is used, for example, for a sheathed thermocouple, a sheathed resistance thermometer, a microheater, or the like. As is well known, one or a plurality of pairs of thermocouple wires are held as the wires of an MI cable used for a sheathed thermocouple, typically three or four copper wires are held as the wires of an MI cable used for a sheathed resistance thermometer, and one or two electrical resistance wires are held as the wires of an MI cable used for a microheater.

An MI cable is used mainly in a high temperature environment or corrosive environment that is intolerable for an ordinary soft cable having an insulating material or a covering material made of polyethylene, vinyl, rubber, or the like. At an end of the MI cable, the wires of the MI cable are connected to lead wires of a soft cable. For example, the thermocouple wires of an MI cable for a sheathed thermocouple are connected to lead wires of a soft cable configured by thermocouple compensating lead wires, the copper wires of an MI cable for a sheathed resistance thermometer are connected to lead wires of a soft cable configured by copper lead wires, and the electrical resistance wires of an MI cable for a microheater are connected to lead wires of a soft cable for supplying a current to these wires.

The structure for connecting the wires at an end of the MI cable to the lead wires of the soft cable is required to realize a function of insulating the interior of the MI cable from the outside air by sealing in order to prevent the insulating properties of the mineral insulating powder inside the MI cable from being lowered by the entrance of moisture, and a function of preventing breakage of a thin wire exposed from the metal sheath of an MI cable especially in the case of an MI cable having a small outer diameter.

Patent Documents 1 and 2 describe a simple structure for an end of an MI cable, in which a portion connecting wires exposed from the metal sheath to lead wires of a soft cable is covered by a metal sleeve, and the metal sleeve is filled with an insulating material.

Hereinafter, a conventional structure for an MI cable having two wires will be described. Note that the same can be applied to those having a different number of wires.

Figure 7:
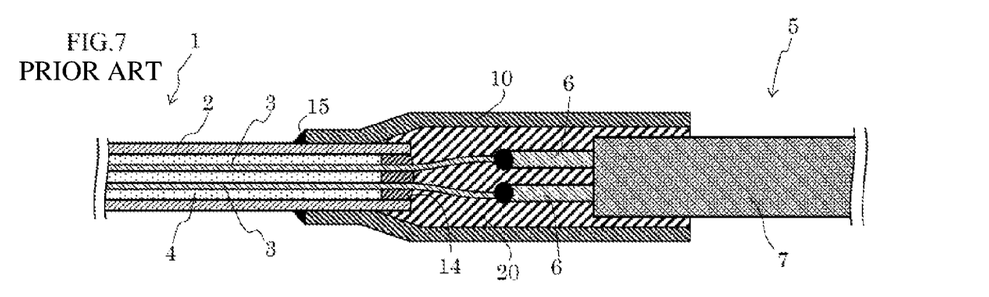
FIG. 7 is a cross-sectional view showing a conventional structure for an end of an MI cable used for a sheathed thermocouple.

FIG. 7 is a typical example of a simple structure for an end of an MI cable conventionally used for a sheathed thermocouple, corresponding to the structure shown in FIG. 2 of Patent Document 1. FIG. 7 is a cross-sectional view, wherein a soft cable 5 is shown as a view from the outside.

A portion connecting ends of two wires 3 exposed from an MI cable 1, in which the wires 3 are held in a cylindrical metal sheath 2 with a mineral insulating powder 4 interposed therebetween, to ends of lead wires 6 exposed by stripping off a cover 7 of the soft cable 5 is held in a metal sleeve 10, and the metal sleeve 10 is filled with a resin 20. The interior of the MI cable 1 is insulated from the outside air by the resin 20, so that the insulating properties are prevented from being lowered by the entrance of moisture, and breakage of the thin wires 3 exposed from the MI cable 1 is prevented by the metal sleeve 10 and the resin 20.

Although not described in Patent Document 1, the interior of the MI cable 1 is often sealed from the outside, by removing in advance the mineral insulating powder at an end of the MI cable 1 and filling the space formed by the removal with a resin sealing member 14, in order to reliably insulate the interior of the MI cable 1 from the outside air. Furthermore, an end 15 of the metal sleeve 10 on the MI cable-side is often welded or brazed around the entire circumference of the metal sheath 2 of the MI cable 1.

Figure 8:
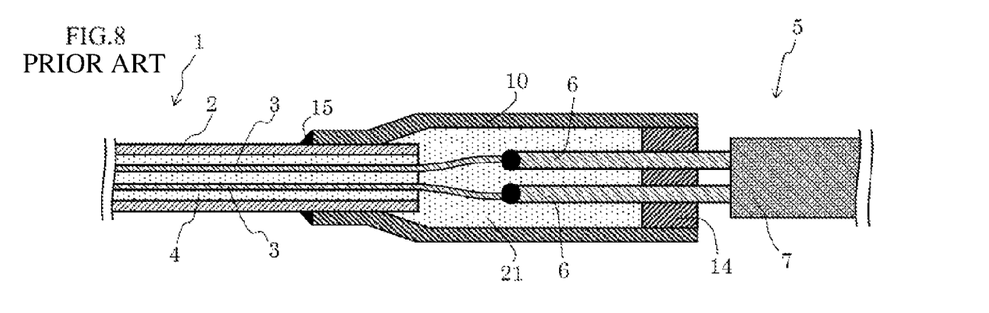
FIG. 8 is a cross-sectional view showing a conventional structure for an end of an MI cable used for a microheater.

FIG. 8 is a typical example of a simple structure for an end of an MI cable conventionally used for a microheater, corresponding to the structure shown in FIG. 1(a) of Patent Document 2. FIG. 8 is a cross-sectional view, wherein the soft cable 5 is shown as a view from the outside.

A portion connecting ends of two wires 3 exposed from the MI cable 1, in which the wires 3 are held in a cylindrical metal sheath 2 with a mineral insulating powder 4 interposed therebetween, to ends of lead wires 6 exposed by stripping off a cover 7 of the soft cable 5 is held in a metal sleeve 10, as in the example shown in FIG. 7.

In the case of a microheater, the wires 3 of the MI cable 1 are electrical resistance wires, and the temperature at the end of the MI cable 1 may increase due to heat generated by the wires 3. Thus, in view of heat resistance, a resin is seldom used therein. Instead, a mineral insulating powder 21 is often used to fill the metal sleeve 10, and a heat-resistant sealing member 14 such as glass or ceramic is often used to seal the end of the metal sleeve 10. Furthermore, since the mineral insulating powder 21 has no sealing properties, an end 15 of the metal sleeve 10 on the MI cable-side is always welded or brazed around the entire circumference of the metal sheath 2 of the MI cable 1. The interior of the MI cable 1 is insulated from the outside air by the welding or the brazing around the entire circumference of the sealing member 14, and breakage of the wires 3 exposed from the MI cable 1 is prevented by the metal sleeve 10 and the mineral insulating powder 21.

Note that, in FIGS. 7 and 8, the same constituent components as those in embodiments of the present invention are denoted by the same reference numerals as those in drawings illustrating the embodiments of the invention. The same can be applied to FIG. 9 described later.

Other examples of a simple structure for an end of an MI cable used for a sheathed thermocouple include a structure as shown in FIG. 2 of Patent Document 3 in which a metal holding arm that bridges an MI cable and a soft cable is provided as a mechanical reinforcing member instead of a metal sleeve, and the entire connecting portion including the holding arm is molded with a resin. Also in this case, the end of the MI cable 1 is often sealed by a resin in advance, in order to reliably insulate the interior of the MI cable from the outside air.

PRIOR ART DOCUMENT

Patent Document

[Patent Document 1] JP 11-166867A
[Patent Document 2] JP 2010-257582A

[Patent Document 3] Microfilm of Japanese Utility Model Application No. 56-101755 (Laid-open No. 58-8135)

SUMMARY OF INVENTION

Problem to be Solved by the Invention

Typical examples of a simple structure for an end of an MI cable, connecting wires of the MI cable to lead wires of a soft cable, are shown in FIGS. 7 and 8, but even these simple structures require a large number of processing steps for the production.

Figure 9:
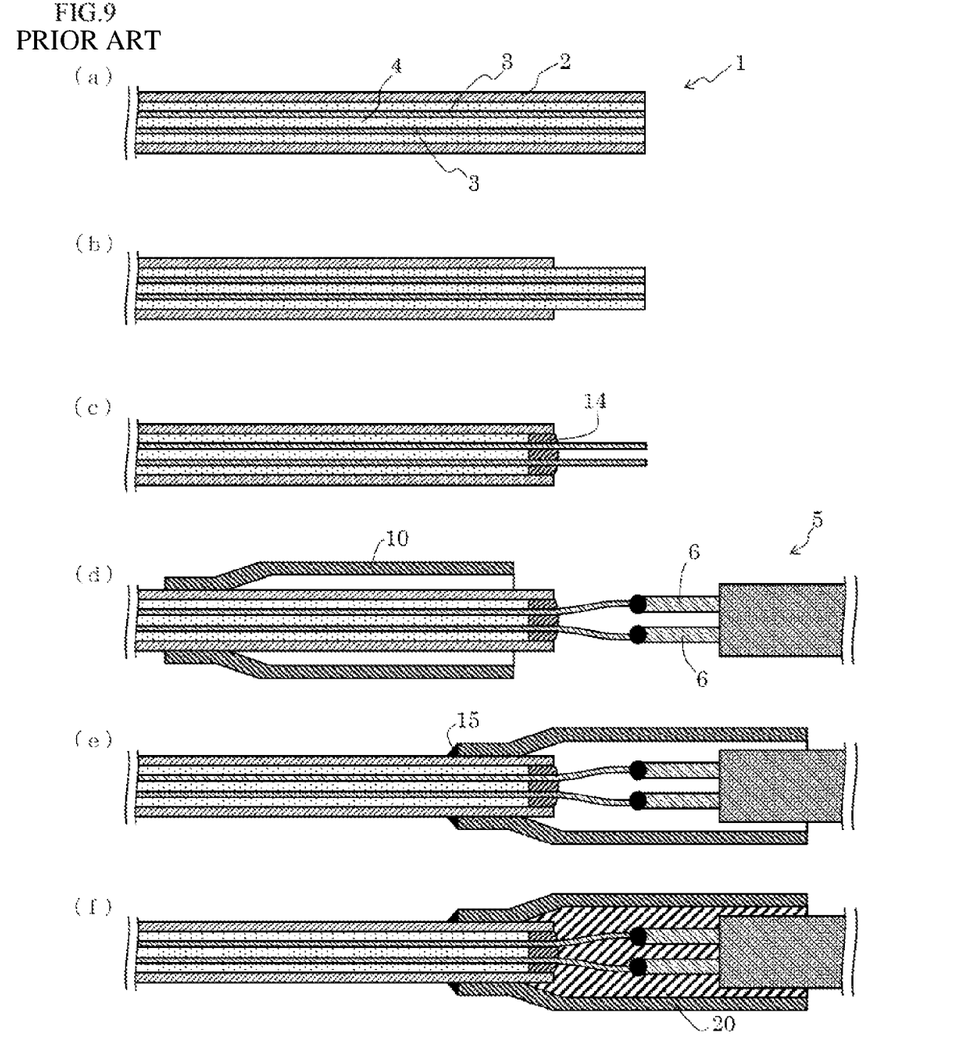
FIG. 9 is a cross-sectional view showing processing steps for producing the structure for the end of the MI cable shown in FIG. 7.

FIG. 9 is a cross-sectional view showing processing steps for producing the structure for the end shown in FIG. 7. The soft cable 5 is shown as a view from the outside. Note that the reference numerals in FIG. 9 are indicated only at points where the constituent components are shown first.

First, an MI cable 1 configured by a metal sheath 2, a mineral insulating powder 4, and wires 3 is cut to have a necessary length as shown in FIG. 9(a). Then, the metal sheath 2 is stripped off such that the wires 3 at the end are exposed as shown in FIG. 9(b). The mineral insulating powder 4 inside the metal sheath 2 that has been stripped off is removed, the mineral insulating powder 4 at the end of the MI cable 1 is removed, and the space formed by the removal is filled with the resin sealing member 14 as shown in FIG. 9(c). Then, the exposed ends of the wires 3 and ends of lead wires 6 of the soft cable 5 are connected as shown in FIG. 9(d). The wires are connected typically by welding, brazing, or crimping. Then, a metal sleeve 10 fitted in advance around the MI cable 1 is slid to a predetermined position, and the end 15 of the metal sleeve 10 on the MI cable-side is attached by being welded around the entire circumference of the metal sheath 2 of the MI cable 1 as shown in FIG. 9(e). Then, a resin 20 is applied to fill the metal sleeve 10, and is dried and cured, so that the completed state is obtained as shown in FIG. 9(f).

In this manner, a conventional structure for an end of an MI cable is problematic in that it requires a large number of processing steps, and further requires a large amount of effort and time for the production. Basically, there is a similar problem in the structure for the end shown in FIG. 8 and the structure for the end shown in FIG. 2 of Patent Document 3. Although the structure for the end in FIG. 8 does not require the process that seals the end of the MI cable with the resin sealing member 14 or the process that fills the metal sleeve 10 with the resin 20, it additionally involves a process that fills the mineral insulating powder 21 and a process that seals the end of the metal sleeve 10 with the sealing member 14. Also, although the structure shown in FIG. 2 of Patent Document 3 does not require the process that welds or brazes the metal sleeve 10 around the entire circumference of the metal sheath 2 or the process that fills the metal sleeve 10 with the resin 20, it additionally involves a process that attaches the holding arm and a process that performs resin molding.

The present invention was arrived at in view of the above-described problem that the production requires a large amount of effort and time, and it is an object thereof to provide a connector-type structure for an end of an MI cable, capable of being produced in a short time with a small number of processing steps, in which the structure for the end of the MI cable is configured as a male connector having a rod-like electrode or as a female connector having a cylindrical electrode and is connected to a female connector or a male connector provided on a soft cable.

Means for Solving the Problems

In order to solve the above-described problem, the structure for an end of an MI cable is provided as shown in third and fourth aspects described below, and the method for producing the same is provided as shown in first, second, and fifth to seventh aspects described below.

(First Aspect)

In order to solve the above-described problem and achieve the above-described object, a first aspect of the present invention is directed to a method for producing a structure for an end of an MI cable in which one or a plurality of wires are held in a cylindrical metal sheath with a mineral insulating powder interposed therebetween:

wherein the structure includes a connector attached to the end of the MI cable, the end being formed by cutting the MI cable substantially at the right angle with respect to the axial direction thereof;

the connector has:

a metal sleeve having one through hole, and having at least one end in the shape of a cylindrical portion having an inner diameter that allows an inner face of the cylindrical portion to come into contact with an outer face of the metal sheath and having a thickness smaller than that of the metal sheath, wherein the end of the MI cable is inserted into the cylindrical portion, and an end of the cylindrical portion is welded around the entire circumference of the metal sheath of the MI cable;

a hermetic sealant made of an insulating material, provided in front of the end of the MI cable inserted into the through hole of the metal sleeve with respect to the insertion direction, and having an outer circumference in contact with the metal sleeve around the entire inner circumference thereof, thereby preventing the outside air from entering the side of the metal sleeve on which the MI cable has been inserted; and metal pins provided in the same number as the number of the wires of the MI cable, made of an electric conductive material harder than the wires of the MI cable, inserted via the hermetic sealant into the through hole of the metal sleeve in an axial direction thereof, and each having a sharp-pointed portion at a front end thereof on the side closer to the cylindrical portion of the metal sleeve and a rod-like or cylindrical portion at a rear end thereof on the side opposite from the cylindrical portion;

the metal pins are arranged such that an axial direction of the front ends thereof substantially conforms to the axial direction of the cylindrical portion of the metal sleeve, the sharp-pointed front ends thereof are positioned on the same plane perpendicular to the axial direction of the cylindrical portion of the metal sleeve, and an arrangement of the sharp-pointed front ends on that plane matches an arrangement of the wires on the cutting surface of the MI cable, the metal pins are fixed by the hermetic sealant in a state where the sharp-pointed front end of each of the metal pins is stuck substantially perpendicularly into the end face of each of the wires of the MI cable, and in a state where the metal pins are prevented from being brought into contact with each other and with the metal sleeve, and the cylindrical portion of the metal sleeve into which the end of the MI cable is inserted has a thickness smaller than that of the metal sheath, the method including:
- an MI cable inserting step (1) of inserting the end of the MI cable, the end being formed by cutting the MI cable substantially at a the right angle with respect to an the axial direction thereof, into the cylindrical portion of the metal sleeve having the hermetic sealant to which the metal pins are attached such that the sharp-pointed front end of each of the metal pins is brought substantially perpendicularly into contact with the end face of each of the wires of the MI cable; and
- a metal sleeve welding step of welding the end of the cylindrical portion of the metal sleeve around the entire circumference of the metal sheath of the MI cable, in a state where the portion of the MI cable not inserted into the metal sleeve is immobilized and the metal sleeve is prevented from sliding in a direction away from the MI cable;

wherein, due to shrinkage of the cylindrical portion of the metal sleeve after the welding around the entire circumference in the metal sleeve welding step, the sharp-pointed front ends of the metal pins are stuck substantially perpendicularly into the end faces of the wires of the MI cable, and, thus, the structure for the end of the MI cable is produced.

According to above-described structure, the wires of the MI cable are not exposed from the MI cable, and, thus, prevention of breakage of the wires does not need to be provided even in the case of an MI cable having a small outer diameter. Furthermore, since the hermetic sealant is provided and the end of the metal sleeve on the MI cable-side is welded around the entire circumference of the metal sheath of the MI cable, the interior of the MI cable is insulated from the outside air, so that the insulating properties of the mineral insulating powder inside the MI cable are prevented from being lowered by the entrance of moisture.

Furthermore, the end of the attached connector on the side opposite from the MI cable is configured as a male connector (or a female connector) having rod-like (or cylindrical) rear ends of the metal pins in the metal sleeve or protruding from the end face of the metal sleeve, and can be fitted into a corresponding female connector (or male connector) provided on an end of an ordinary soft cable having an insulating material or a covering material made of polyethylene, vinyl, rubber, or the like, so that the wires of the MI cable and the lead wires of the soft cable can be connected. Note that it is economical to shape the metal sleeve and the metal pins as the male connector (or the female connector) on the MI cable-side so it can be fitted into an inexpensive general-purpose female connector (or male connector) that is commercially available.

According to the production method of the present invention, the processing steps for producing the structure for the end of the MI cable are as follows. Only if a metal sleeve of a connector using metal pins as lead wires and having a hermetic sealant is prepared in advance, basically, the production requires only two steps consisting of an MI cable inserting step (1) and a metal sleeve welding step. That is to say, there is no need to perform conventional complicated processes such as a process that exposes the wires, a process that fills the metal sleeve with a resin or a mineral insulating powder, and a process that seals the end of the metal sleeve with a sealing member, which, together with a reduction in the number of processing steps, makes it possible to perform the production in an extremely shorter time than that in conventional examples.

According to the production method of the present invention, since the end of the cylindrical portion of the metal sleeve on the MI cable-side has a wall thickness smaller than that of the metal sheath of the MI cable, and the end of the cylindrical portion of the metal sleeve is welded around the entire circumference of the metal sheath of the MI cable in a state where the connector is prevented from sliding in the direction away from the MI cable, a molten pool of the welding shrinks after the welding, and, furthermore, the cylindrical portion of the metal sheath at which the temperature becomes higher than the metal sheath of the MI cable due to the welding heat shrinks more than the metal sheath after the welding, and, thus, the connector slides toward the MI cable.

(Second Aspect)

A second aspect of the present invention is directed to the method for producing the structure for the end of the MI cable according to the first aspect, a sealing member made of a resin that fills a space formed by removing the mineral insulating powder at the end of the MI cable;

wherein the structure for the end of the MI cable further includes a sealing member made of a resin that fills a space formed by removing the mineral insulating powder at the end of the MI cable;

and the interior of the MI cable is sealed from the outside by the sealing member, the method further including:
- a sealing member filling step of filling, with a sealing member made of a resin, a space formed by removing the mineral insulating powder at the end of the MI cable, the end being formed by cutting the MI cable substantially at a the right angle with respect to an the axial direction thereof;
- wherein, in the MI cable inserting step (1), the MI cable is inserted into the cylindrical portion of the metal sleeve having the hermetic sealant to which the metal pins are attached such that the sharp-pointed front ends of the metal pins are brought substantially perpendicularly into contact with the end faces of the wires at the end of the MI cable or a surface of the sealing member immediately over the end faces of the wires of the MI cable covered by the filled sealing member, and the sealing member filling step is performed before the MI cable inserting step (1).

According to the structure of this aspect, not only because the hermetic sealant is provided and the end of the metal sleeve on the MI cable-side is welded around the entire circumference of the metal sheath of the MI cable, but also because the sealing member is further provided at the end of the MI cable, sealing of the interior of the MI cable from the outside air is doubled, and the interior of the MI cable has been reliably insulated from the outside air. According to the production method of the present invention, with this sealing process, the number of processing steps increases, but the process that seals the end of the MI cable is conventionally performed in many cases as described above, and it is not complicated as the conventional process that exposes the wires. Accordingly, the advantage that the production is possible in a short time with a small number of processing steps compared with conventional examples is not impaired.

(Third Aspect)

A third aspect of the present invention is directed to a structure for an end of an MI cable in which one or a plurality of wires are held in a cylindrical metal sheath with a mineral insulating powder interposed therebetween, including:

a connector attached to the end of the MI cable, the end being formed by cutting the MI cable substantially at a right angle with respect to an axial direction thereof;

wherein the connector has:

a metal sleeve having one through hole, and having at least one end in the shape of a cylindrical portion having an inner diameter that allows an inner face of the cylindrical portion to come into contact with an outer face of the metal sheath and having a thickness smaller than that of the metal sheath, wherein the end of the MI cable is inserted into the cylindrical portion, and an end of the cylindrical portion is welded around the entire circumference of the metal sheath of the MI cable;

a stopper block made of an insulating material, provided in front of the end of the MI cable inserted into the through hole of the metal sleeve with respect to the insertion direction, and having through holes;

metal pins provided in the same number as the number of the wires of the MI cable, made of an electric conductive material harder than the wires of the MI cable, inserted via the through holes of the stopper block into the through hole of the metal sleeve in an axial direction thereof, and each having a sharp-pointed portion at a front end thereof on the side closer to the cylindrical portion of the metal sleeve and a rod-like or cylindrical portion at a rear end thereof on the side opposite from the cylindrical portion; and a sealing member made of a resin that fills a space formed by removing the mineral insulating powder at the end of the MI cable, the sealing member being provided such that the interior of the MI cable is sealed from the outside;

the number of through holes provided in the stopper block is the same as the number of the metal pins, and each of the metal pins is inserted into each of the through holes, the metal pins are each provided with a protruding portion having an outer diameter larger than the smallest diameter of the through hole of the stopper block or a portion curved greater than the smallest diameter of the through hole of the stopper block, and the protruding portion or the curved portion abuts against the stopper block around the through hole, so that the metal pin cannot be pulled out in a direction away from the cylindrical portion of the metal sleeve, and, furthermore, a clearance from the metal pin inside the through hole of the stopper block to the through hole of the stopper block is set such that a change in the angle of the metal pin allowed by the clearance is 2 degrees or smaller, the metal pins are arranged such that, in a state where the protruding portion or the curved portion of the metal pins abuts against the stopper block around the through hole, an axial direction of the front ends of the metal pins substantially conforms to the axial direction of the cylindrical portion of the metal sleeve, the sharp-pointed front ends thereof are positioned on the same plane perpendicular to the axial direction of the cylindrical portion of the metal sleeve, and an arrangement of the sharp-pointed front ends on that plane matches an arrangement of the wires on the cutting surface of the MI cable, and the metal pins are fixed by a pressure from the stopper block at a point where the protruding portion or the curved portion abuts against the stopper block around the through hole, in a state where the sharp-pointed front end of each of the metal pins is stuck substantially perpendicularly into the end face of each of the wires of the MI cable, and in a state where the metal pins are prevented from being brought into contact with each other and with the metal sleeve.

Moreover, prevention of breakage of the wires of the MI cable does not need to be provided even in the case of an MI cable having a small outer diameter because the wires are not exposed from the MI cable, as in the first and the second aspects.

(Fourth Aspect)

An fourth aspect of the present invention is directed to the structure for the end of the MI cable according to the third aspects, wherein the front end of each of the metal pins is branched into a plurality of sharp-pointed portions.

In the case of a metal pin merely having a sharp-pointed front end, which is to be stuck into the end face of the wire of the MI cable, especially if a plurality of such wires are arranged, precise positioning of the metal pins is necessary to stick all of the metal pins into the respective wires. On the other hand, in the case of a metal pin having a plurality of sharp-pointed portions as in the present invention, even when there is slight displacement in the position, the metal pin can be electrically connected to the wire as long as any one of the plurality of sharp-pointed portions is stuck into the end face of the wire.

(Seventh Aspect)

A seventh aspect of the present invention is directed to a method for producing the structure for the end of the MI cable of the third aspect, including:

a sealing member filling step of filling, with a sealing member made of a resin, a space formed by removing the mineral insulating powder at the end of the MI cable, the end being formed by cutting the MI cable substantially at the right angle with respect to the axial direction thereof;

an MI cable inserting step (2) of inserting the MI cable into the cylindrical portion of the metal sleeve having the stopper block through which the metal pins are inserted such that the sharp-pointed front ends of the metal pins are brought substantially perpendicularly into contact with the end faces of the wires at the end of the MI cable or a surface of the sealing member immediately over the end faces of the wires of the MI cable covered by the filled sealing member; and a metal sleeve welding step of welding an end of the cylindrical portion of the metal sleeve around the entire circumference of the metal sheath of the MI cable, in a state where the portion of the MI cable not inserted into the metal sleeve is immobilized and the metal sleeve is prevented from sliding in a direction away from the MI cable;

wherein, due to shrinkage of the cylindrical portion of the metal sleeve after the welding around the entire circumference in the metal sleeve welding step, the sharp-pointed front ends of the metal pins are stuck substantially perpendicularly into the end faces of the wires of the MI cable, and, thus, the structure for the end of the MI cable is produced.

According to the present invention, the time necessary for the production can be shortened because the number of processing steps is reduced and complicated processes are avoided compared with conventional examples, and, furthermore, due to shrinkage after welding of the end of the cylindrical portion of the metal sleeve around the entire circumference of the metal sheath of the MI cable, the sharp-pointed front ends of the metal pins are stuck substantially perpendicularly into the wires of the MI cable, as in the first and the second aspects.

(Sixth Aspect)

An sixth aspect of the present invention is directed to the method for producing the structure for the end of the MI cable according to any one of the first, the second, and the fifth aspects, wherein the front end of each of the metal pins has a plurality of sharp-pointed portions. This aspect provides the effects as described in the fourth aspect.

(Seventh Aspect)

A seventh aspect of the present invention is directed to the method for producing the structure for the end of the MI cable according to any one of the first, the second, and the fifth aspects, further including:

a connector impact step of impacting an end face of the connector on the side opposite from the MI cable, so that the sharp-pointed front ends of the metal pins are stuck substantially perpendicularly into the end faces of the wires of the MI cable;

wherein the connector impact step is performed before the metal sleeve welding step.

If the shrinkage amount of the cylindrical portion of the metal sleeve after the welding is so small that the length by which the sharp-pointed front ends of the metal pins are stuck into the wires of the MI cable is not sufficient, contact failures tend to occur at this position. According to the method of the present invention, if the shrinkage amount is small, the end face of the connector on the side opposite from the MI cable is impacted, so that the front ends of the metal pins are sufficiently stuck into the wires of the MI cable.

Effects of the Invention

According to the present invention, a process that connects wires of an MI cable to lead wires of an ordinary soft cable having an insulating material or a covering material made of polyethylene, vinyl, rubber, or the like, the process conventionally requiring a large number of processing steps, and further requiring a large amount of effort and time for the production, can be performed in a short time with a small number of processing steps.

MODES FOR CARRYING OUT THE INVENTION

First Embodiment

Figure 1:
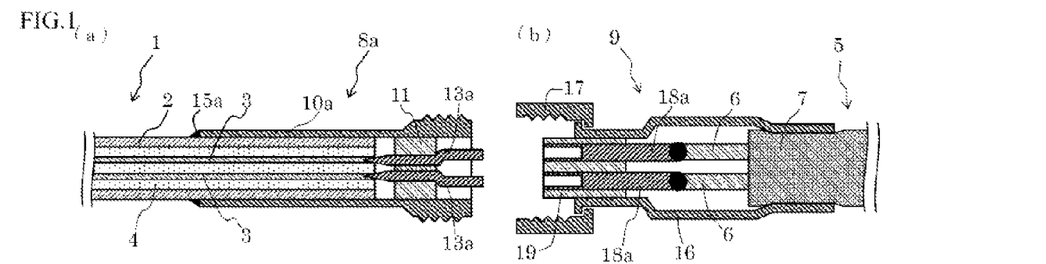
FIG. 1(a) is a cross-sectional view of a structure for an end of an MI cable according to a first embodiment of the present invention.
FIG. 1(b) is a cross-sectional view of a structure for an end of a soft cable that can be connected to the end of the MI cable.

Hereinafter, a structure for an end of an MI cable and processing steps for producing the same according to a first embodiment of the present invention will be described with reference to the drawings. FIG. 1(a) is a cross-sectional view of a structure for an end of an MI cable according to the first embodiment of the present invention, and FIG. 1(b) is a cross-sectional view of a structure for an end of an ordinary soft cable that can be connected to the structure for the end of the MI cable, and that has an insulating material or a covering material made of polyethylene, vinyl, rubber, or the like. Note that, although an MI cable 1 having two wires will be described in this embodiment, the same can be applied to those having one wire or having three or more wires, and a description thereof has been omitted. The same can be applied to the other embodiments.

As shown in FIG. 1(a), a connector 8a is attached to an end of an MI cable 1 in which two wires 3 are held in a cylindrical metal sheath 2 with a mineral insulating powder 4 interposed therebetween, the end being formed by cutting the MI cable 1 substantially at a right angle with respect to the axial direction. The connector 8a is configured by a metal sleeve 10a having one through hole, a hermetic sealant 11 made of an insulating material, provided in front of the end of the MI cable 1 inserted into the through hole of the metal sleeve 10a with respect to the insertion direction, and having an outer circumference in contact with the metal sleeve 10a around the entire inner circumference thereof, thereby preventing the outside air from entering the side of the metal sleeve 10a on which the MI cable 1 has been inserted, and two metal pins 13a provided in the same number as the number of wires 3 of the MI cable 1, and inserted through the hermetic sealant 11 in the axial direction of the through hole of the metal sleeve 10a.

The left end of the metal sleeve 10a on the MI cable 1-side is in the shape of a cylindrical portion having an inner diameter that allows the inner face of the cylindrical portion to come into contact with the outer face of the metal sheath 2 of the MI cable 1, and having a thickness smaller than that of the metal sheath 2, and the outer surface of the right end is provided with a male thread.

The metal pins 13a each have a sharp-pointed portion at a front end thereof on the side closer to the cylindrical portion of the metal sleeve 10a, that is, at a front end thereof on the left side closer to the MI cable 1, and a columnar rod-like portion at a rear end thereof on the opposite side, and are made of a material harder than that for the wires 3 of the MI cable 1.

The metal pins 13a are arranged such that the axial direction of the front ends thereof substantially conforms to the axial direction of the cylindrical portion of the metal sleeve 2, the sharp-pointed front ends thereof are positioned on the same plane perpendicular to the axial direction of the cylindrical portion, and the arrangement of the sharp-pointed front ends on that plane matches the arrangement of the end faces of the wires 3 on the cutting surface of the MI cable 1.

The processing steps for the production are as follows. The end of the MI cable 1, formed by cutting the MI cable 1 substantially at a right angle with respect to the axial direction, is inserted into the cylindrical portion of the metal sleeve 10a of the connector 8a such that the sharp-pointed front ends of the metal pins 13a are respectively brought substantially perpendicularly into contact with the end faces of the wires 3 (MI cable inserting step (1)). Then, in a state where the portion of the MI cable 1 not inserted into the connector 8a is immobilized and the connector 8a is prevented by a jig (not shown) from sliding in the direction away from the MI cable 1, an end 15a of the cylindrical portion of the metal sleeve 10a is welded around the entire circumference of the metal sheath 2 of the MI cable 1 (metal sleeve welding step), and, thus, the production is completed.

The metal pins 13a are fixed by the hermetic sealant 11 in a state where the sharp-pointed front end of each of the metal pins 13a is stuck substantially perpendicularly into the end face of each of the wires 3 due to shrinkage of the cylindrical portion of the metal sleeve 10a after the welding, and in a state where the metal pins 13a are prevented from being brought into contact with each other and with the metal sleeve 10a.

If the shrinkage amount of the cylindrical portion of the metal sleeve 10a after the welding is so small that the length by which the sharp-pointed front ends of the metal pins 13a are stuck into the wires 3 is not sufficient, the end face of the connector 8a on the side opposite from the MI cable 1 may be impacted before the welding around the entire circumference so that the front ends of the metal pins 13a are sufficiently stuck into the wires 3 (connector impact step). On the other hand, if the shrinkage amount is so large that problems such as deformation of the connector 8a occur, the thickness of the cylindrical portion of the metal sleeve 10a may be set to be equal to or larger than the thickness of the metal sheath 2 so that an increase in the temperature in the cylindrical portion at the time of welding is suppressed and the shrinkage amount is reduced. These techniques can be applied also to the second to the fourth embodiments described later.

Since the connector 8a attached to the end of the MI cable 1 shown in FIG. 1(a) is configured as a male connector from which the metal pins 13a project as rod-like electrodes, and can be fitted into a female connector 9 provided on the soft cable 5-side as shown in FIG. 1(b), the wires 3 of the MI cable 1 and lead wires 6 of the soft cable 5 can be connected.

FIG. 1(b) is a cross-sectional view showing an example of a female connector at the end of the soft cable 5, wherein the soft cable 5 is shown as a view from the outside. The lead wires 6 exposed by stripping off a cover 7 of the soft cable 5 are connected by welding, brazing, or crimping to metal rods 18a having cylindrical ends on the left side, the metal rods 18a are held by a block 19 made of an insulating material, and the block 19 is fixed to an outer frame 16 by bonding or using screws (not shown). Furthermore, the soft cable 5 is fixed to the outer frame 16 by crimping at the right end of the outer frame 16.

A ring 17 provided with a female thread is rotatably attached to the left end of the outer frame 16. With rotation of the ring 17, the female thread is screwed into the male thread at the right end of the sleeve 10a, so that the rod-like portions at the right ends of the metal pins 13a are inserted into the cylindrical portions at the left ends of the metal rods 18a, and the wires 3 and the lead wires 6 are connected.

According to this embodiment, since the constituent components other than the hermetic sealant 11 are made of a metal or a mineral insulating material, if the hermetic sealant 11 is made of a heat-resistant material such as glass or ceramic, the entire structure for the end can be made heat resistant. Accordingly, this structure is preferable as a structure for an end of an MI cable for a microheater and the like, in which electrical resistance wires are held as the wires and heat is generated.

A conceivable specific example for the application to a microheater is such that a connector 8a configured by a hermetic sealant 11 made of ceramic, a metal sleeve 10a made of SUS347, and metal pins 13a made of SUS440C having high hardness is attached to an MI cable 1 having an outer diameter of 4.8 mm and configured by a metal sheath 2 made of SUS316, a mineral insulating powder 4 made of magnesia, and wires 3 that are two nichrome wires.

In this embodiment, a case was described in which the end of the MI cable 1 is not filled with a resin sealing member, but there is no limitation to this. If the end of the MI cable 1 in use is at a temperature not exceeding the allowable temperature of a resin, a configuration may be adopted in which, as in the second embodiment described below, the mineral insulating powder 4 at the end of the MI cable 1 is removed, and the space formed by the removal is filled with a resin sealing member, so that the interior of the MI cable 1 is sealed from the outside by the sealing member. In this case, in the MI cable inserting step (1), the MI cable 1 is inserted into the cylindrical portion of the metal sleeve 10a such that the sharp-pointed front ends of the metal pins 13a are brought substantially perpendicularly into contact with the end faces of the wires at the end of the MI cable 1 or the surface of the sealing member immediately over the end faces of the wires of the MI cable 1 covered by the filled sealing member. With this processing, not only because the hermetic sealant 11 is provided and the end of the metal sleeve 10a on the MI cable 1-side is welded around the entire circumference of the metal sheath 2 of the MI cable 1, but also because a sealing member is further provided at the end of the MI cable 1, sealing of the interior of the MI cable 1 from the outside air is doubled, and the interior of the MI cable 1 is reliably insulated from the outside air.

Second Embodiment

Figure 2:
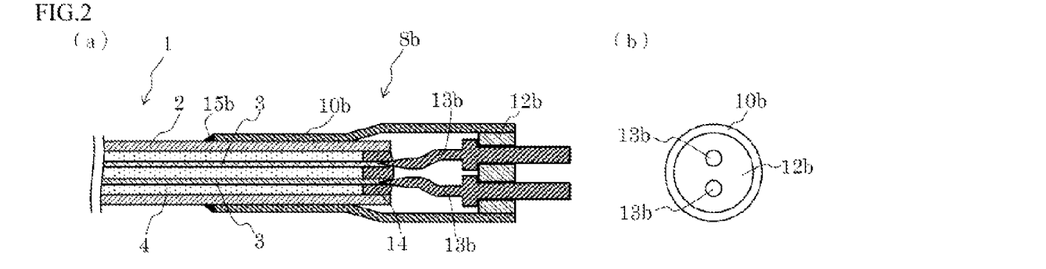
FIG. 2(a) is a cross-sectional view of a structure for an end of an MI cable according to a second embodiment of the present invention.
FIG. 2(b) is a right side view of the structure for the end of the MI cable.
Figure 3:
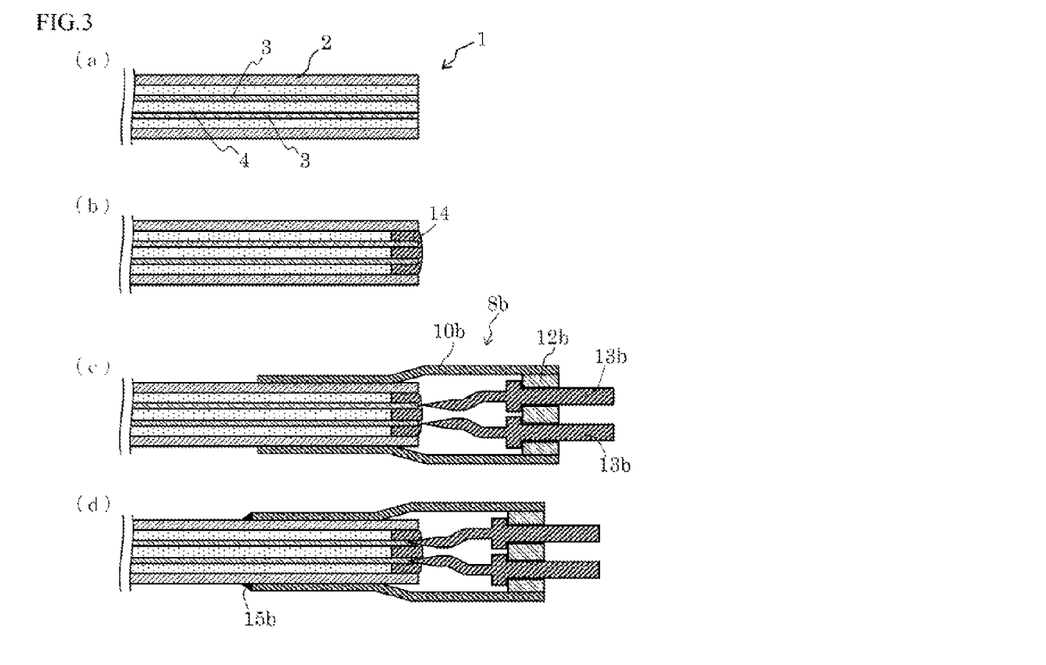
FIG. 3 is a cross-sectional view illustrating processing steps for producing the structure for the end of the MI cable according to the second embodiment of the present invention.

Next, a structure for an end of an MI cable and processing steps for producing the same according to a second embodiment of the present invention will be described with reference to the drawings. FIG. 2(a) is a cross-sectional view of a structure for an end of an MI cable according to the second embodiment of the present invention, and FIG. 2(b) is a right side view of the structure for the end of the MI cable. FIG. 3 is a cross-sectional view illustrating processing steps for producing the structure for the end of the MI cable according to the second embodiment. Note that the same constituent components as those in the first embodiment are denoted by the same reference numerals, and achieve the same actions and effects.

As shown in FIG. 2(a), a connector 8b is attached to an end of an MI cable 1 in which two wires 3 are held in a cylindrical metal sheath 2 with a mineral insulating powder 4 interposed therebetween, the end being formed by cutting the MI cable 1 substantially at a right angle with respect to the axial direction. The connector 8b is configured by a metal sleeve 10b having one through hole, a stopper block 12b made of an insulating material, provided in front of the end of the MI cable 1 inserted into the through hole of the metal sleeve 10b with respect to the insertion direction, and provided with through holes, and two metal pins 13b provided in the same number as the number of wires 3 of the MI cable 1, and inserted via the through holes of the stopper block 12b into the through hole of the metal sleeve 10b in the axial direction thereof.

The space formed by removing the mineral insulating powder 4 at the end of the MI cable 1 is filled with the resin sealing member 14.

The stopper block 12b is fixed with an adhesive to the inner face of the metal sleeve 10b, and the left end of the metal sleeve 10b on the MI cable 1-side is in the shape of a cylindrical portion having an inner diameter that allows the inner face of the cylindrical portion to come into contact with the outer face of the metal sheath 2 of the MI cable 1, and having a thickness smaller than that of the metal sheath 2.

The metal pins 13b each have a sharp-pointed portion at a front end thereof on the left side closer to the MI cable 1, and a columnar rod-like portion at a rear end thereof on the opposite side, and are made of a material harder than that for the wires 3 of the MI cable 1.

A middle portion of each of the metal pins 13b is provided with a protruding portion having a diameter larger than the smallest diameter of the through hole of the stopper block 12b, and this portion abuts against the stopper block 12b around the through hole, so that the metal pins 13b cannot be pulled out of the metal sleeve 10b in the right direction. Not that the abutment of the metal pins 13b against the stopper block 12b around the through holes is not limited to that resulting from a change in the diameter of the metal pins 13b. For example, each of the metal pins 13b may be provided with a portion curved greater than the smallest diameter of the through hole of the stopper block 12b, and this curved portion may abut against the stopper block 12b around the through hole so that the metal pins 13b cannot be pulled out in the right direction.

Furthermore, a clearance from each of the metal pins 13b inside the through hole to the through hole is set such that a change in the angle allowed by the clearance is 2 degrees or smaller.

The metal pins 13b are arranged such that, in a state where their protruding portions having a larger diameter abut against the stopper block 12b, the axial direction of the front ends thereof on the left side substantially conforms to the axial direction of the cylindrical portion of the metal sleeve 10b, the sharp-pointed front ends thereof are positioned on the same plane perpendicular to the axial direction of the cylindrical portion, and the arrangement of the sharp-pointed front ends on that plane matches the arrangement of the end faces of the wires 3 on the cutting surface of the MI cable 1.

As shown in FIGS. 2(a) and 2(b), the right end of the connector 8b is configured as a plug from which the columnar rod-like portions of the metal pins 13b project as electrodes, and can be fitted into a socket provided on the soft cable-side, so that the wires 3 and lead wires of the soft cable can be connected. The socket on the soft cable-side may have the same configuration as that of sockets commonly used for home electric appliances, and, thus, a description thereof has been omitted.

Next, the processing steps for the production according to this embodiment will be described with reference to FIG. 3. FIG. 3 is a cross-sectional view illustrating processing steps for producing the structure for the end of the MI cable according to the second embodiment of the present invention. Note that the description of those already described in FIG. 2 such as the description of reference numerals will not be repeated. Further, the reference numerals are indicated only at points where the constituent components are shown first.

The MI cable 1 is cut substantially at a right angle with respect to the axial direction as shown in FIG. 3(a), the mineral insulating powder 4 at the end of the MI cable 1 is removed, and the space formed by the removal is filled with the resin sealing member 14 as shown in FIG. 3(b) (sealing member filling step). Then, the end of the MI cable 1 is inserted into the cylindrical portion of the metal sleeve 10b of the connector 8b such that the sharp-pointed front ends of the metal pins 13b are brought substantially perpendicularly into contact with the surface of the sealing member 14 immediately over the end faces of the wires 3 covered by the resin sealing member 14 as shown in FIG. 3(c) (MI cable inserting step (2)). Then, in a state where the portion of the MI cable 1 not inserted into the connector 8b is immobilized and the connector 8b is prevented by a jig (not shown) from sliding in the direction away from the MI cable 1, an end 15b of the cylindrical portion of the metal sleeve 10b is welded around the entire circumference of the metal sheath 2 of the MI cable 1 as shown in FIG. 3(d) (metal sleeve welding step), and, thus, the production is completed.

Due to shrinkage after welding of the end of the cylindrical portion of the metal sleeve 10b around the entire circumference of the metal sheath 2 of the MI cable 1, the sharp-pointed front end of each of the metal pins 13 is stuck substantially perpendicularly into each of the wires 3, as in the first embodiment.

According to the second embodiment, since the resin sealing member 14 is not heat resistant, it is difficult to use this structure for a microheater as in the first embodiment, but this structure is preferable as a structure for an end of an MI cable for a sheathed thermocouple, a sheathed resistance thermometer, and the like, in which heat is not generated.

A conceivable specific example for the application to a sheathed thermocouple is such that a connector 8b configured by a stopper block 12b made of a resin, a metal sleeve 10b made of SUS347, and metal pins 13b made of a material with an increased hardness obtained by performing quenching on the same metal as that used for forming the wires 3, which are thermocouple wires, or on the same metal as that used for forming compensating lead wires thereof is attached to an MI cable 1 having an outer diameter of 6.4 mm and configured by a metal sheath 2 made of SUS316, a mineral insulating powder 4 made of magnesia, and wires 3 that are a pair of thermocouple wires.

Third Embodiment

Figure 4:
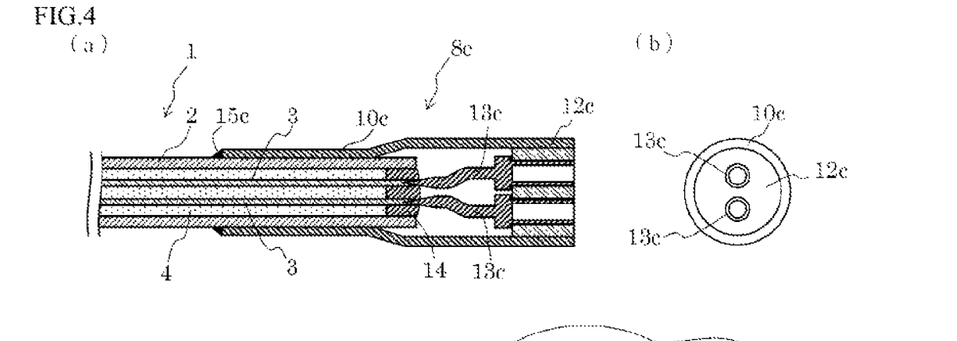
FIG. 4(a) is a cross-sectional view of a structure for an end of an MI cable according to a third embodiment of the present invention.
FIG. 4(b) is a right side view of the structure for the end of the MI cable.

Next, a structure for an end of an MI cable according to a third embodiment of the present invention will be described with reference to the drawings. FIG. 4(a) is a cross-sectional view of a structure for an end of an MI cable according to the third embodiment of the present invention, and FIG. 4(b) is a right side view of the structure for the end of the MI cable. Although a male connector was attached to the MI cable 1 in the first and the second embodiments of the present invention, a female connector is attached to the MI cable 1 in the third embodiment of the present invention. Note that the same constituent components as those in the second embodiment are denoted by the same reference numerals, and achieve the same actions and effects.

The right ends of metal pins 13c are cylindrical, and their end faces are positioned on the same plane as the right end face of a stopper block 12c. With this structure, as shown in FIGS. 4(a) and 4(b), the right end of a connector 8c is configured as a socket, and a plug provided on the soft cable-side can be fitted thereinto, so that the wires 3 and lead wires of the soft cable can be connected. The plug on the soft cable-side may have the same configuration as that of plugs commonly used for home electric appliances, and, thus, a description thereof has been omitted.

The other configurations, features, actions and effects, and specific examples are the same as those in the second embodiment, and the processing steps for the production are also similar to those in the second embodiment. Furthermore, the configuration in which a female connector is attached to the MI cable 1 in the third embodiment can be applied also to the first embodiment. That is to say, although the connector 8a on the MI cable 1-side was configured as a male connector from which the rear ends of the metal pins 13a project as rod-like electrodes in the first embodiment, it may be a female connector having the rear ends of the metal pins 13a as cylindrical electrodes, and the connector 9 configured as a male connector on the soft cable 7-side may be fitted thereinto.

Fourth Embodiment

A portion connecting an MI cable for a microheater, a sheathed thermocouple, or a sheathed resistance thermometer to a soft cable is often held inside a metal frame called a terminal head so as not to be damaged even by a strong force applied from the outside.

Figure 5:
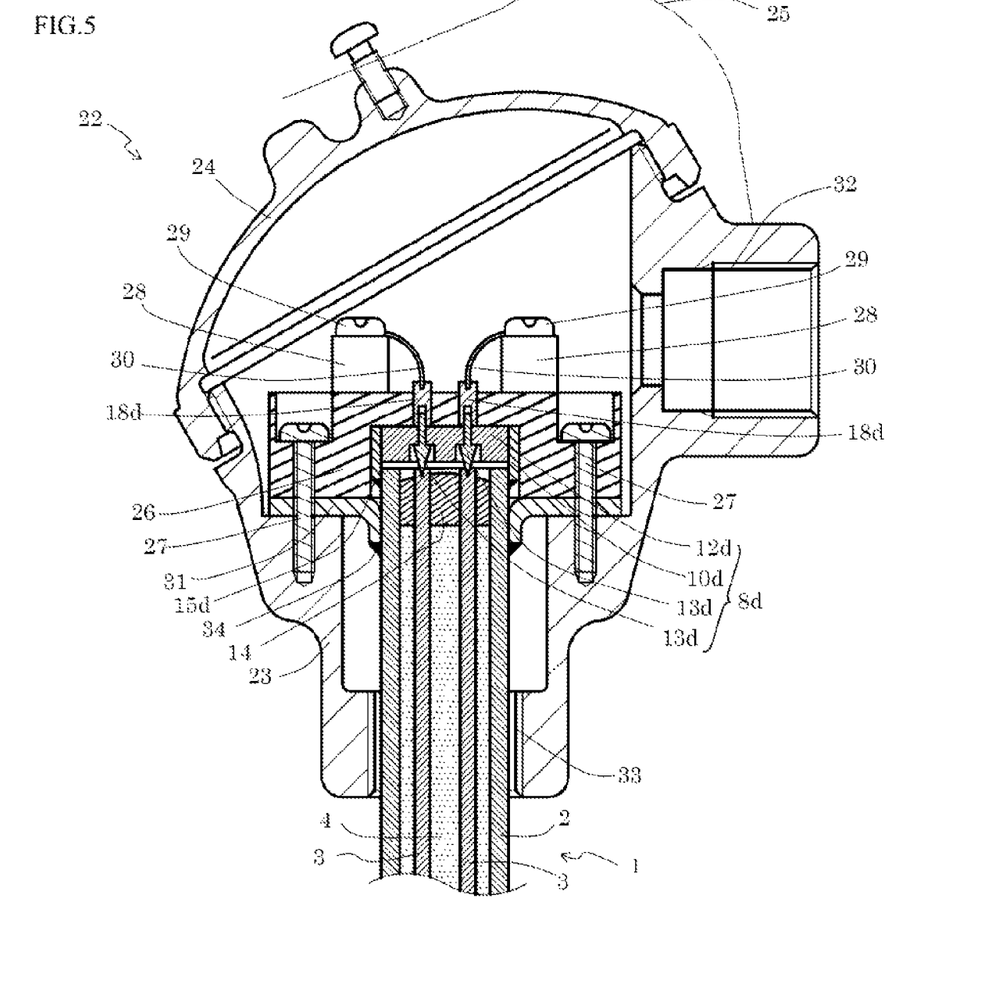
FIG. 5 is a cross-sectional view of a structure for an end of an MI cable held in a terminal head according to a fourth embodiment of the present invention.

Hereinafter, structures of an end of an MI cable and a terminal head according to a fourth embodiment of the present invention will be described in the order of production steps with reference to the drawing. Specifically, in this embodiment, an example of a portion connecting an MI cable for a sheathed thermocouple and a soft cable using compensating lead wires as an electric conductive material, held in a terminal head will be described. FIG. 5 is a cross-sectional view of a structure for an end of an MI cable held in a terminal head according to the fourth embodiment of the present invention. Note that the same constituent components as those in the first to the third embodiments are denoted by the same reference numerals, and achieve the same actions and effects.

An end of an MI cable 1 in which two wires 3 are held in a cylindrical metal sheath 2 with a mineral insulating powder 4 interposed therebetween, the end being formed by cutting the MI cable 1 substantially at a right angle with respect to the axial direction, is inserted into an opening 33 at the bottom of an outer frame member 23 of a terminal head 22, and is then further inserted into an opening provided at the center of a terminal plate support fitting 31 and having a diameter that allows the inner face thereof to come into contact with the outer face of the metal sheath 2.

Then, a connector 8d is attached to an end of the MI cable 1. In this example, the space formed by removing the mineral insulating powder 4 at the end of the MI cable 1 is filled with the resin sealing member 14, and the connector 8d is configured by a metal sleeve 10d having one through hole, and a stopper block 12d made of an insulating material and having two through holes into which two metal pins 13d provided in the same number as the number of the wires are inserted.

The stopper block 12d is fixed with an adhesive to the inner face of the metal sleeve 10d, and the metal sleeve 10d has a cylindrical portion having an inner diameter that allows the inner face of the cylindrical portion to come into contact with the outer face of the metal sheath 2 of the MI cable 1, and having a thickness smaller than that of the metal sheath 2.

The metal pins 13d each have a sharp-pointed conical portion at a front end thereof on the side closer to the cylindrical portion of the metal sleeve 10d, that is, at a front end thereof on the lower side closer to the MI cable 1, and a rod-like portion at a rear end thereof on the side opposite from the cylindrical portion of the metal sleeve 10d, that is, at an end thereof on the upper side, and are made of a material harder than that for the wires 3 of the MI cable 1.

The bottom of the conical portion of each of the metal pins 13d is provided with a protruding portion having a diameter larger than that of the through hole of the stopper block 12d, and this bottom portion abuts against the stopper block 12d, so that the metal pins 13d cannot be pulled out of the metal sleeve 10d in the upper direction.

Furthermore, a clearance from each of the metal pins 13d inside the through hole to the through hole is set such that a change in the angle allowed by the clearance is 2 degrees or smaller.

The metal pins 13d are arranged such that, in a state where the bottom portions of their conical portions, which are portions having a larger diameter, abut against the stopper block 12d, the axial direction of the front ends thereof on the lower side substantially conforms to the axial direction of the cylindrical portion of the metal sleeve 10d, the sharp-pointed front ends thereof are positioned on the same plane perpendicular to the axial direction of the cylindrical portion, and the arrangement of the sharp-pointed front ends on that plane matches the arrangement of the end faces of the wires 3 on the cutting surface of the MI cable 1.

The MI cable 1 is attached to the connector 8d as follows. The end of the MI cable 1 is inserted into the cylindrical portion of the metal sleeve 10d of the connector 8d such that the sharp-pointed front ends of the metal pins 13d are respectively brought substantially perpendicularly into contact with the wires 3 (MI cable inserting step (2)). Then, in a state where the portion of the MI cable 1 not inserted into the connector 8d is immobilized and the connector 8d is prevented by a jig (not shown) from sliding in the direction away from the MI cable 1, an end 15d of the cylindrical portion of the metal sleeve 10d is welded around the entire circumference of the metal sheath 2 of the MI cable 1 (metal cable welding step), and, thus, the attachment is completed. The columnar rod-like portions of the metal pins 13d project as electrodes from the upper end of the connector 8d.

Due to shrinkage after welding of the end of the cylindrical portion of the metal sleeve 10d around the entire circumference of the metal sheath 2 of the MI cable 1, the sharp-pointed front end of each of the metal pins 13d is stuck substantially perpendicularly into each of the wires 3, as in the first to the third embodiments.

Next, a terminal plate 26 made of an insulating material in which metal rods 18d each having a lower portion in the shape of a cylinder are embedded is placed on the connector 8d, so that the metal pins 13d are inserted into the cylindrical metal rods 18d. The terminal plate 26 and the terminal plate support fitting 31 are temporarily fixed with an adhesive. Then, an opening end 34 of the terminal plate support fitting 31 is welded or brazed around the metal sheath 2, and the terminal plate 26 and the terminal plate support fitting 31 are fixed to the outer frame member 23 of the terminal head 22 with terminal plate fixing screws 27.

Connection fittings 28 holding wiring screws 29 therein are arranged on the upper face of the terminal plate 26, and the upper ends of the metal rods 18*d* and the wiring screws 29 are electrically connected via compensating lead wires 30.

Lastly, a soft cable (not shown) using compensating lead wires as the lead wires is inserted from an opening 32 at the side face of the outer frame member 23 of the terminal head 22, and the exposed lead wires are connected to the wiring screws 29, after which a lid 24 is closed. The lid 24 is tethered to the outer frame member 23 of the terminal head 22 by a chain 25 to prevent loss.

Typically, the outer frame member 23 of the terminal head 22 and the lid 24 are formed by aluminum die casting, and the insulating portion of the terminal plate 26 is made of a resin. A conceivable specific example of the MI cable 1 and the connector 8*d* for the application to a sheathed thermocouple is such that the MI cable 1 has an outer diameter of 22 mm, and the MI cable and the connector are made of the same materials as those shown in the specific example in the third embodiment.

(Shape of Front Ends of Metal Pins)

In the first to the fourth embodiments, the front end of each metal pin that is stuck into the wire has one sharp-pointed portion as shown in FIGS. 1 to 5.

Figure 6:
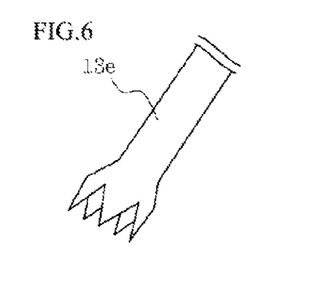
FIG. 6 is an external view of a metal pin whose front end is provided with a plurality of sharp-pointed portions according to the present invention.

Instead of such a front end, the front end of a metal pin 13*e* may be provided with a plurality of sharp-pointed portions as shown in the external view in FIG. 6. If a plurality of sharp-pointed portions are provided, even when the front end of the metal pin is slightly dislocated from the end face of the wire 3 of the MI cable 1, the metal pin can be electrically connected to the wire 3 as long as any one of the plurality of sharp-pointed portions is stuck into the end face of the wire 3.

The embodiments disclosed herein are to be considered in all respects as illustrative and not limiting. The scope of the invention is indicated by the appended claims rather than by the foregoing description. All changes which come within the meaning and range of equivalency of the claims are intended to be embraced therein.

INDUSTRIAL APPLICABILITY

As described above, this structure can be used as a structure for an end of a microheater, a sheathed thermocouple, and a sheathed resistance thermometer. The application is not limited thereto, and this structure can be used also as a structure for an end of an MI cable for transmitting signals of current, voltage, or the like, and also as a structure for an end of an MI cable for supplying electric power.

DESCRIPTION OF REFERENCE NUMERALS

1 MI Cable
2 Metal sheath
3 Wire
4 Mineral insulating powder
5 Soft cable
6 Lead wire
7 Cover
8 Connector (MI cable-side)
9 Connector (soft cable-side)
10 Metal sleeve
11 Hermetic sealant
12 Stopper block
13 Metal pin
14 Sealing material
15 Portion to be welded (Suffixes a to d and e added to the reference numerals respectively correspond to the first to the fourth embodiments and the modified example regarding the front end of the metal pin.)

The invention claimed is:

1. A method for producing a structure for an end of an MI cable in which one or a plurality of wires are held in a cylindrical metal sheath with a mineral insulating powder interposed therebetween,
    wherein the structure includes a connector attached to the end of the MI cable, the end being formed by cutting the MI cable substantially at a right angle with respect to an axial direction thereof,
    the connector has:
        a metal sleeve having one through hole, and having at least one end in the shape of a cylindrical portion having an inner diameter that allows an inner face of the cylindrical portion to come into contact with an outer face of the metal sheath, wherein the end of the MI cable is inserted into the cylindrical portion, and an end of the cylindrical portion is welded around the entire circumference of the metal sheath of the MI cable;
        a hermetic sealant made of an insulating material, provided in front of the end of the MI cable inserted into the through hole of the metal sleeve with respect to the insertion direction, and having an outer circumference in contact with the metal sleeve around the entire inner circumference thereof, thereby preventing the outside air from entering the side of the metal sleeve on which the MI cable has been inserted; and
        metal pins provided in the same number as the number of the wires of the MI cable, made of an electric conductive material harder than the wires of the MI cable, inserted via the hermetic sealant into the through hole of the metal sleeve in an axial direction thereof, and each having a sharp-pointed portion at a front end thereof on the side closer to the cylindrical portion of the metal sleeve and a rod-like or cylindrical portion at a rear end thereof on the side opposite from the cylindrical portion;
    the metal pins are arranged such that an axial direction of the front ends thereof substantially conforms to the axial direction of the cylindrical portion of the metal sleeve, the sharp-pointed front ends thereof are positioned on the same plane perpendicular to the axial direction of the cylindrical portion of the metal sleeve, and an arrangement of the sharp-pointed front ends on that plane matches an arrangement of the wires on the cutting surface of the MI cable,
    the metal pins are fixed by the hermetic sealant in a state where the sharp-pointed front end of each of the metal pins is stuck substantially perpendicularly into the end face of each of the wires of the MI cable, and in a state where the metal pins are prevented from being brought into contact with each other and with the metal sleeve, and
    the cylindrical portion of the metal sleeve into which the end of the MI cable is inserted has a thickness smaller than that of the metal sheath,
    the method comprising:
        an MI cable inserting step (1) of inserting the end of the MI cable, the end being formed by cutting the MI cable substantially at the right angle with respect to the axial direction thereof, into the cylindrical portion of the metal sleeve of the connector having the hermetic sealant to which the metal pins are attached such that the sharp-pointed front end of each of the metal pins is brought substantially perpendicularly into contact with the end face of each of the wires of the MI cable;

a metal sleeve welding step of welding the end of the cylindrical portion of the metal sleeve around the entire circumference of the metal sheath of the MI cable, in a state where the portion of the MI cable not inserted into the metal sleeve is immobilized and the metal sleeve is prevented from sliding in a direction away from the MI cable; and a metal pins sticking step of sticking the sharp-pointed front ends of the metal pins substantially perpendicularly into the end faces of the wires of the MI cable due to shrinkage of the cylindrical portion of the metal sleeve after the welding around the entire circumference in the metal sleeve welding step to produce the structure for the end of the MI cable.

2. The method for producing the structure for the end of the MI cable according to claim 1, wherein the structure for the end of the MI cable further includes a sealing member made of a resin that fills a space formed by removing the mineral insulating powder at the end of the MI cable, and the interior of the MI cable is sealed from the outside by the sealing member, the method further comprising:

a sealing member filling step of filling, with a sealing member made of a resin, a space formed by removing the mineral insulating powder at the end of the MI cable, the end being formed by cutting the MI cable substantially at the right angle with respect to the axial direction thereof;

wherein, in the MI cable inserting step (1), the MI cable is inserted into the cylindrical portion of the metal sleeve having the hermetic sealant to which the metal pins are attached such that the sharp-pointed front ends of the metal pins are brought substantially perpendicularly into contact with the end faces of the wires at the end of the MI cable or a surface of the sealing member immediately over the end faces of the wires of the MI cable covered by the filled sealing member, and the sealing member filling step is performed before the MI cable inserting step (1).

3. The method for producing the structure for the end of the MI cable according to 1, wherein the front end of each of the metal pins is branched into a plurality of sharp-pointed portions.

4. The method for producing the structure for the end of the MI cable according to 1, further comprising:

a connector impact step of impacting an end face of the connector on the side opposite from the MI cable, so that the sharp-pointed front ends of the metal pins are stuck substantially perpendicularly into the end faces of the wires of the MI cable;

wherein the connector impact step is performed before the metal sleeve welding step.

5. The method for producing the structure for the end of the MI cable according to claim 2, wherein the front end of each of the metal pins is branched into a plurality of sharp-pointed portions.

6. The method for producing the structure for the end of the MI cable according to claim 2, further comprising:

a connector impact step of impacting an end face of the connector on the side opposite from the MI cable, so that the sharp-pointed front ends of the metal pins are stuck substantially perpendicularly into the end faces of the wires of the MI cable;

wherein the connector impact step is performed before the metal sleeve welding step.

7. A method for producing a structure for an end of an MI cable in which one or a plurality of wires are held in a cylindrical metal sheath with a mineral insulating powder interposed therebetween, comprising:

a connector attached to the end of the MI cable, the end being formed by cutting the MI cable substantially at a right angle with respect to an axial direction thereof;

wherein the connector has:

a metal sleeve having one through hole, and having at least one end in the shape of a cylindrical portion having an inner diameter that allows an inner face of the cylindrical portion to come into contact with an outer face of the metal sheath and having a thickness smaller than that of the metal sheath, wherein the end of the MI cable is inserted into the cylindrical portion, and an end of the cylindrical portion is welded around the entire circumference of the metal sheath of the MI cable;

a stopper block made of an insulating material, provided in front of the end of the MI cable inserted into the through hole of the metal sleeve with respect to the insertion direction, and having through holes;

metal pins provided in the same number as the number of the wires of the MI cable, made of an electric conductive material harder than the wires of the MI cable, inserted via the through holes of the stopper block into the through hole of the metal sleeve in an axial direction thereof, and each having a sharp-pointed portion at a front end thereof on the side closer to the cylindrical portion of the metal sleeve and a rod-like or cylindrical portion at a rear end thereof on the side opposite from the cylindrical portion; and a sealing member made of a resin that fills a space formed by removing the mineral insulating powder at the end of the MI cable, the sealing member being provided such that the interior of the MI cable is sealed from the outside;

the number of through holes provided in the stopper block is the same as the number of the metal pins, and each of the metal pins is inserted into each of the through holes, the metal pins are each provided with a protruding portion having an outer diameter larger than the smallest diameter of the through hole of the stopper block or a portion curved greater than the smallest diameter of the through hole of the stopper block, and the protruding portion or the curved portion abuts against the stopper block around the through hole, so that the metal pin cannot be pulled out in a direction away from the cylindrical portion of the metal sleeve, and, furthermore, a clearance from the metal pin inside the through hole of the stopper block to the through hole of the stopper block is set such that a change in the angle of the metal pin allowed by the clearance is 2 degrees or smaller, the metal pins are arranged such that, in a state where the protruding portion or the curved portion of the metal pins abuts against the stopper block around the through hole, an axial direction of the front ends of the metal pins substantially conforms to the axial direction of the cylindrical portion of the metal sleeve, the sharp-pointed front ends thereof are positioned on the same plane perpendicular to the axial direction of the cylindrical portion of the metal sleeve, and an arrangement of the sharp-pointed front ends on that plane matches an arrangement of the wires on the cutting surface of the MI cable, and the metal pins are fixed by a pressure from the stopper block at a point where the protruding portion or the curved portion abuts against the stopper block around the through hole, in a state where the sharp-pointed front end of each of the metal pins is stuck substantially perpendicularly into the end face of each of the wires of the MI cable, and in a state where the metal pins are prevented from being brought into contact with each other and with the metal sleeve, the method comprising:

a sealing member filling step of filling, with a sealing member made of a resin, a space formed by removing the mineral insulating powder at the end of the MI cable, the end being formed by cutting the MI cable substantially at the right angle with respect to the axial direction thereof;

an MI cable inserting step (2) of inserting the MI cable into the cylindrical portion of the metal sleeve having the stopper block through which the metal pins are inserted such that the sharp-pointed front ends of the metal pins are brought substantially perpendicularly into contact with the end faces of the wires at the end of the MI cable or a surface of the sealing member immediately over the end faces of the wires of the MI cable covered by the filled sealing member; and a metal sleeve welding step of welding an end of the cylindrical portion of the metal sleeve around the entire circumference of the metal sheath of the MI cable, in a state where the portion of the MI cable not inserted into the metal sleeve is immobilized and the metal sleeve is prevented from sliding in a direction away from the MI cable;

wherein, due to shrinkage of the cylindrical portion of the metal sleeve after the welding around the entire circumference in the metal sleeve welding step, the sharp-pointed front ends of the metal pins are stuck substantially perpendicularly into the end faces of the wires of the MI cable, and, thus, the structure for the end of the MI cable is produced.

8. The method for producing the structure for the end of the MI cable according to claim 7, wherein the front end of each of the metal pins is branched into a plurality of sharp-pointed portions.

9. The method for producing the structure for the end of the MI cable according to claim 7, further comprising:

a connector impact step of impacting an end face of the connector on the side opposite from the MI cable, so that the sharp-pointed front ends of the metal pins are stuck substantially perpendicularly into the end faces of the wires of the MI cable;

wherein the connector impact step is performed before the metal sleeve welding step.

* * * * *

UNITED STATES PATENT AND TRADEMARK OFFICE
CERTIFICATE OF CORRECTION

PATENT NO.        : 9,711,892 B2
APPLICATION NO.   : 14/356949
DATED             : July 18, 2017
INVENTOR(S)       : Taketo Nishikawa et al.

It is certified that error appears in the above-identified patent and that said Letters Patent is hereby corrected as shown below:

In the Specification

Column 8, Line 23, replace "(Seventh Aspect)" with -- (Fifth Aspect) --.

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*